US010316726B2

(12) United States Patent
Jerges et al.

(10) Patent No.: US 10,316,726 B2
(45) Date of Patent: Jun. 11, 2019

(54) EXHAUST-GAS MODULE FOR AN INTERNAL COMBUSTION ENGINE

(71) Applicant: TENNECO GMBH, Edenkoben (DE)

(72) Inventors: Michael Jerges, Neustadt (DE); Tobias Pfeffer, Ilbesheim (DE); Vladislav Levun, Speyer (DE); Pierre Tipner, Wissembourg (FR); Bertram Stelzer, Neustadt (DE); Marcel Womann, Neustadt (DE)

(73) Assignee: TENNECO GMBH, Edenkoben (DE)

( * ) Notice: Subject to any disclaimer, the term of this patent is extended or adjusted under 35 U.S.C. 154(b) by 0 days.

(21) Appl. No.: 15/317,691

(22) PCT Filed: Jun. 15, 2015

(86) PCT No.: PCT/EP2015/063341
§ 371 (c)(1),
(2) Date: Dec. 9, 2016

(87) PCT Pub. No.: WO2015/193241
PCT Pub. Date: Dec. 23, 2015

(65) Prior Publication Data
US 2017/0114698 A1    Apr. 27, 2017

(30) Foreign Application Priority Data
Jun. 18, 2014   (DE) .................... 20 2014 102 809 U

(51) Int. Cl.
*F01N 1/02*        (2006.01)
*F01N 3/08*        (2006.01)
(Continued)

(52) U.S. Cl.
CPC ..... *F01N 13/1805* (2013.01); *B01D 46/0002* (2013.01); *B01D 53/944* (2013.01);
(Continued)

(58) Field of Classification Search
CPC ............... B01D 46/0002; F01N 13/009; F01N 2470/20
See application file for complete search history.

(56) References Cited

U.S. PATENT DOCUMENTS 3,109,511 A * 11/1963 Slayter ..................... C23D 5/10
                                                        181/245
6,260,659 B1 * 7/2001 Takahashi ................. F01N 1/08
                                                        181/227
(Continued)

FOREIGN PATENT DOCUMENTS

DE   10 2012 205 350 A1   10/2013
EP        1 510 674 A1     3/2005
(Continued)

*Primary Examiner* — Audrey K Bradley
*Assistant Examiner* — Anthony Ayala Delgado
(74) *Attorney, Agent, or Firm* — Hudak, Shunk & Farine Co. LPA

(57) ABSTRACT

An exhaust-gas module A for an internal combustion engine, which exhaust-gas module has a base housing having a first side wall, at least one second side wall, an inlet for connection to the internal combustion engine and at least one outlet, wherein the inlet is arranged in the first side wall, and having multiple exhaust-gas purification components which are arranged in the base housing, wherein at least one SCR and/or one DOC are/is provided, wherein the at least one outlet is arranged in the second side wall and serves for the connection of an exhaust tailpipe of the internal combustion engine and/or alternatively for the coupling of an attachment housing, wherein the rest of the base housing, with the exception of the second side wall, is formed without outlets, wherein a connection contour with a circumferential contour U1 which has a basic shape G1 is provided for the connection of the attachment housing, wherein the connection contour delimits the second side wall at the edge, wherein at least one of the exhaust-gas purification components DPF, NH3, LNT, HOH is present in the base housing, and/or
(Continued)

wherein at least one auxiliary component such as a mixer, an injector or a burner is present in the base housing.

19 Claims, 2 Drawing Sheets

(51) Int. Cl.
  *F01N 3/10* (2006.01)
  *F01N 3/20* (2006.01)
  *F01N 5/02* (2006.01)
  *B01D 46/00* (2006.01)
  *B01D 53/94* (2006.01)
  *F01N 13/00* (2010.01)
  *F01N 13/02* (2010.01)
  *F01N 13/08* (2010.01)
  *F01N 13/18* (2010.01)
  *F01N 3/021* (2006.01)

(52) U.S. Cl.
  CPC ..... *B01D 53/9418* (2013.01); *B01D 53/9422* (2013.01); *B01D 53/9431* (2013.01); *F01N 1/02* (2013.01); *F01N 1/023* (2013.01); *F01N 3/021* (2013.01); *F01N 3/0814* (2013.01); *F01N 3/103* (2013.01); *F01N 3/2066* (2013.01); *F01N 5/025* (2013.01); *F01N 13/009* (2014.06); *F01N 13/0097* (2014.06); *F01N 13/02* (2013.01); *F01N 13/082* (2013.01); *B01D 2279/30* (2013.01); *F01N 3/0842* (2013.01); *F01N 2340/00* (2013.01); *F01N 2470/18* (2013.01); *F01N 2470/20* (2013.01); *F01N 2490/08* (2013.01); *F01N 2570/14* (2013.01); *Y02A 50/2325* (2018.01); *Y02T 10/20* (2013.01)

(56) References Cited

U.S. PATENT DOCUMENTS

| | | | |
|---|---|---|---|
| 8,926,726 B2* | 1/2015 | Mitsuda | F01N 13/00 55/523 |
| 2012/0311984 A1* | 12/2012 | Mitsuda | F01N 13/00 55/508 |
| 2017/0030247 A1* | 2/2017 | Suetou | F01N 13/009 |
| 2017/0067372 A1* | 3/2017 | Irmler | B60K 13/04 |

FOREIGN PATENT DOCUMENTS

| | | |
|---|---|---|
| EP | 1 691 045 A1 | 8/2006 |
| NL | 2002986 C | 12/2010 |
| WO | 2009 024815 A2 | 2/2009 |
| WO | 2010 034651 A1 | 4/2010 |

* cited by examiner

EXHAUST-GAS MODULE FOR AN INTERNAL COMBUSTION ENGINE

FIELD OF THE INVENTION

Various components or catalysts are contemplated for exhaust gas after-treatment, such as are defined below.
SCR: device for selective catalytic reduction including injection, treatment and mixing;
DOC: Diesel oxidation catalyst;
DPF: Diesel particle filter;
LNT: device for NOx reduction, also called a lean NOx trap;
NH3: ammonia trapping catalyst;
HOH: hydrolysis catalyst.

The invention relates to an exhaust-gas module A for an internal combustion engine comprising a base housing having a first side wall, at least one second side wall, an inlet for connection to the internal combustion engine and at least one outlet, wherein the inlet is arranged in the first side wall, and having multiple exhaust-gas purification components which are arranged in the base housing, wherein at least one SCR and/or one DOC is provided.

The invention further relates to an exhaust-gas module B for an internal combustion engine comprising an attachment housing having a first housing wall, at least one second housing wall, an outlet and an inlet for connection to a base housing, wherein the inlet is arranged in the first housing wall and comprising a fastening contour for connection to the base housing.

BACKGROUND OF THE INVENTION

A two-part exhaust-gas treatment unit for an internal combustion engine is already known, having a base housing and an attachment housing secured to it, from EP 1 691 045 A1. The base housing comprises a SCR catalyst and a DOC catalyst, while the attachment contains two exhaust-gas purification components, a DPF and a SCR. In addition to the inlet and outlet of the base housing as connection site to an exhaust gas system, branch pipes are provided on the base housing for connection of the attachment housing.

From WO 2010/034651 A1 there is likewise known an exhaust-gas treatment unit for an internal combustion engine. This only comprises an exhaust-gas module with an integral housing, in which the exhaust-gas purification components DOC, SCR, DPF and HOH are contained. No further module is provided.

From DE 10 2012 205 350 A1 there is known an exhaust gas purification device consisting of two purification stages A, B. Purification stage A has an inlet and purification stage B has an outlet, while inlet and outlet are each provided at one side surface of the assembled exhaust gas purification device. A separate outlet branch of the first component, which can be connected alternatively to an exhaust tailpipe, is not described. Both purification stage A and purification stage B serve for the purification of the exhaust gas.

From WO 2009/024 815 A2 there is likewise known a two-component exhaust gas after-treatment device. This comprises both an inlet and an outlet. A separate outlet branch of the first component, which can be connected alternatively to an exhaust tailpipe, is not described. The exhaust gas purification system comprises two purification regions. The upper region is determined by the DPF, while the lower region is determined by the SCR catalyst. Both serve for the purification of exhaust gas.

From EP 1 691 045 A1 there is known an exhaust gas treatment system, consisting of a base housing and an attachment housing. The base housing, in turn, has two outlets, wherein one outlet can be connected to the attachment housing, while the second outlet is designed for an exhaust tailpipe. In the base housing are found the SCR and an oxidation catalyst, while in the attachment housing are found the DPF as well as a reduction catalyst.

SUMMARY OF THE INVENTION

The invention proposes to solve the problem of modifying and arranging an exhaust-gas module so that an optimal adapting to different exhaust gas after-treatment requirements is assured.

The problem is solved according to the invention in that, for exhaust-gas module A, the at least one outlet is arranged in the second side wall and serves for the connection of an exhaust tailpipe of the internal combustion engine or alternatively for the coupling of an attachment housing, wherein the rest of the base housing, with the exception of the second side wall, is formed without outlets, wherein a connection contour with a circumferential contour U1 which has a basic shape G1 is provided for the connection of the attachment housing, wherein the connection contour delimits the second side wall at the edge, wherein at least one of the following exhaust-gas purification components DPF, NH3, LNT, HOH is comprised in the base housing, and/or wherein at least one auxiliary component such as a mixer, an injector or a burner is comprised in the base housing.

The problem is also solved according to the invention in that, for the exhaust-gas module B, the inlet is placed at the end face and the outlet is arranged in another or in the second housing wall and serves to connect an exhaust tailpipe of the internal combustion engine, wherein the fastening contour has a circumferential contour U2 with a basic shape G2, wherein the fastening contour at least partly delimits the first housing wall at the edge, and acoustic components are contained in the attachment housing for reducing noise emission of the exhaust gas, wherein the attachment housing is free of exhaust-gas purification components which bring about a chemical after-treatment of the exhaust gas. This holds especially in view of the circumstance that every exhaust gas treatment component, i.e., even a chemical component, has an acoustic effect. While this is only passive in nature, it may be enough depending on the requirement for the acoustic exhaust gas treatment. In this case, the exhaust-gas module B can be eliminated entirely. In the event that the requirements for the acoustic exhaust gas treatment are heightened, the exhaust-gas module B can be employed in addition.

The outlet itself can be designed as a branch pipe, to which an exhaust tailpipe can be connected in addition.

Moreover, the problem is solved by an exhaust-gas after-treatment unit consisting of an exhaust-gas module A for an internal combustion engine, comprising a base housing having a first side wall, at least one second side wall, an inlet for connection to the internal combustion engine and at least one outlet, wherein the inlet is arranged in the first side wall, and having multiple exhaust-gas purification components which are arranged in the base housing, wherein at least one SCR and/or one DOC are provided, wherein the at least one outlet is arranged in the second side wall and serves for the connection of an exhaust tailpipe of the internal combustion engine or alternatively for the coupling of an attachment housing, wherein the rest of the base housing, with the exception of the second side wall, is formed without outlets, wherein a connection contour with a circumferential contour U1 which has a basic shape G1 is provided for the connection of the attachment housing, wherein the connection contour delimits the second side wall at an edge, wherein at least one of the exhaust-gas purification components DPF, NH3, LNT, HOH is comprised in the base housing, and/or wherein at least one auxiliary component is comprised in the base housing and an exhaust-gas module B for an internal combustion engine, comprising an attachment housing wherein the outlet of the base housing can be coupled to the inlet of the attachment housing and the fastening contour can be connected to the connection contour, wherein the basic shape G1 and the basic shape G2 are identical or at least geometrically similar, and the second side wall of the exhaust-gas module A and the first housing wall of the exhaust-gas module B can be placed in proximity to each other.

It can also be advantageous for the base housing with the side walls to form or comprise an integral housing wall, in which all exhaust-gas purification components and auxiliary components are contained, or for the attachment housing with the housing walls to form or comprise an integral housing wall in which all acoustic components are contained. The integral housing wall assures a compact and closed modular design for both modules A, B. The exhaust-gas module B can be coupled to the outlet of the exhaust-gas module A, on which a tailpipe of the exhaust gas system would be mounted without use of the exhaust-gas module B, by a simple insertion. No additional or separate pipe branches are needed for the connecting of the exhaust-gas module B. The two modules are directly joined or welded by a common connection collar or by the respective housing. The tailpipe in this case is connected to the outlet of the exhaust-gas module B. Hence, the tailpipe might only need to be adapted in its length. Only the attachment housing can be designed open at the end face near module B, since a closure will be done by the connecting to module A.

Moreover, it can be advantageous to connect an exhaust tailpipe of the internal combustion engine to the outlet. Depending on the exhaust standards, the exhaust-gas module A can also be used by itself. The exhaust-gas module B can simply be eliminated. The exhaust-gas module A will be mounted as usual on the motor vehicle. Only the exhaust tailpipe will be mounted on the outlet of the exhaust-gas module A.

It can also be advantageous for a thermoelectric generator to be contained in the attachment housing as an additional component. A thermoelectric generator formed from various pipe sections also has an acoustic effect, and so it is an acoustic component. Thus, further requirements for the exhaust gas treatment such as heat recovery can be met simply by use of the exhaust-gas module B or by adapting the components contained in the attachment housing of the exhaust-gas module B. No further adapting of the exhaust gas system is needed.

It can be advantageously provided that a thermodynamic unit is contained as an additional component in the attachment housing. The thermodynamic unit serves for a heat recovery and comprises at least one working fluid circuit with a heat exchanger standing in operative connection with the exhaust gas. Further components which can be considered are a pump and an evaporator and a condenser, being preferably integrated in the attachment housing. A thermodynamic unit formed from various components also has an acoustic effect, and so it is an acoustic component. Once again, an adapting of the exhaust gas system is possible simply by configuration of the exhaust-gas module B or the components contained in the attachment housing of the exhaust-gas module B. No further adapting of the exhaust gas system is needed.

Moreover, it can be advantageous to provide as the acoustic component at least one Helmholtz resonator and/or one Lambda/4 resonator and/or one reflection chamber and/or one exhaust flap and/or for the integral housing wall to encompass a volume between 1 liter and 200 liters, or between 50 liters and 80 liters. Thus, the acoustic component is very compact in design. For the tailpipe, diameters between 70 mm and 130 mm can be considered. The indicated dimensions apply in particular to commercial vehicles. For marine applications, and therefore ship engines, correspondingly larger acoustic components are provided.

Moreover, it can be advantageous to provide a connection collar with a contour K geometrically similar to the basic shape G1, G2, which can be connected to the fastening contour and/or to the connection contour. Thus, the attachment of the exhaust-gas module B simply comes down to an extending of the length of exhaust-gas module A. The space conditions for the installation can be adapted to the circumferential shape or the contour of the exhaust-gas module A. Neither is any separate attachment for the exhaust-gas module B necessary in the motor vehicle. The exhaust-gas module B can be fastened solely to the exhaust-gas module A. The connection collar is calibrated according to the size of the exhaust-gas module A or the basic shape G1, G2 and can thus be exactly pushed over or inserted into it. The fastening can be done with a flange or by welding. The connection should be gas-tight in the sense of the usual leakage rates for exhaust gas systems, so that the coupling between the outlet of the exhaust-gas module A and the inlet of the exhaust-gas module B can be designed as a simple insert connection.

Moreover, it can be advantageous for the second side wall to be designed in mirror symmetry with the outlet of the exhaust-gas module A and the second housing wall in mirror symmetry with the inlet of the exhaust-gas module B in regard to a parting plane E subtended between the second side wall and the second housing wall. Thus, for purposes of connecting the exhaust-gas modules A, B or a coupling of the system, it is enough to put the two exhaust-gas modules A, B in place while respecting the housing shape and the housing alignment. It is then only necessary to secure the exhaust-gas module B to the exhaust-gas module A. No further steps are needed for the coupling of the exhaust system. Neither are any further steps needed for the fastening at the motor vehicle end. The exhaust-gas module A is the fastening and alignment basis for the exhaust-gas module B.

It can also be advantageous for the exhaust-gas module B to be secured solely to the exhaust-gas module A and for the exhaust-gas module A to be fixed via support means to a motor vehicle, wherein the exhaust-gas module B is free of support means serving for a fastening to the motor vehicle. In this way, the installation of the exhaust-gas module B is confined to the end-side inserting onto the exhaust-gas module A and the fastening or connecting of both exhaust-gas modules A, B by a connection collar. This can be welded on in a simple manner.

Moreover, it can be advantageous to provide an exhaust tailpipe which is between 10 mm and 800 mm or between 200 mm and 600 mm in length, and/or to provide an exhaust tailpipe with cross section not rotationally symmetrical, having an effective flow cross section between 3850 $mm^2$ and 17,680 $mm^2$. The extending of the exhaust pipe has definite positive influence on the acoustics of the exhaust-gas module and the exhaust-gas after-treatment unit.

BRIEF DESCRIPTION OF THE DRAWINGS

Further benefits and details of the invention are explained in the patent claims and in the specification and represented in the Figures. There are shown:

DETAILED DESCRIPTION OF THE INVENTION

Figure 1:
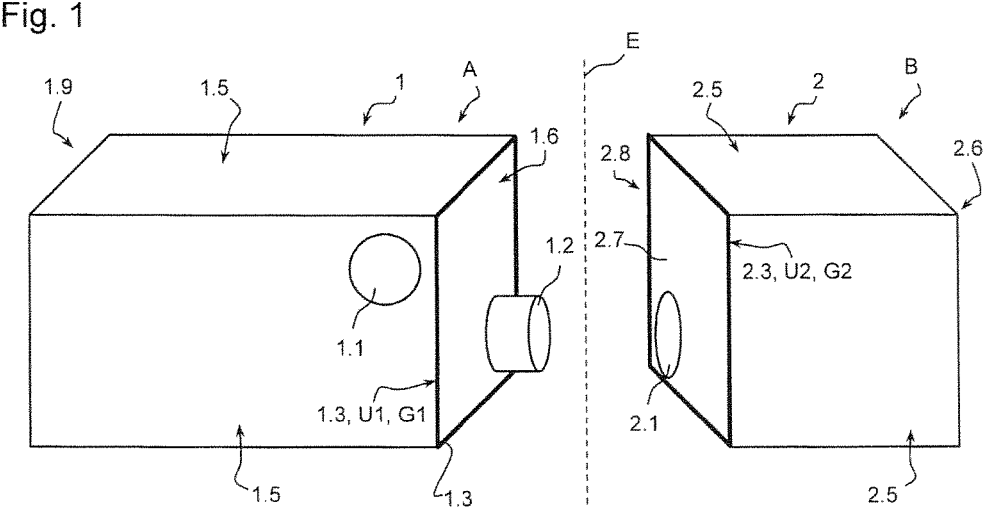
FIG. 1 a schematic of an exhaust system consisting of base housing and attachment housing in disassembled state of both housings.

FIG. 1 shows two exhaust-gas modules A, B, which are designed in mirror symmetry in regard to a parting plane E with respect to their connection position of the outlet 1.2 and inlet 2.1, on the one hand, and with respect to a connection contour 1.3 or a fastening contour 2.3, on the other hand.

The exhaust-gas module A comprises a base housing 1 with several outer walls, a circumferential first side wall 1.5, a second side wall 1.6 and an additional side wall 1.9. Within the second side wall 1.6, which is bounded by the connection contour 1.3, there is provided an outlet or exhaust-gas channel 1.2, from which the exhaust gas emerges from the module A. In departure from this, an inlet or inlet branch 1.1 is provided in the first side wall 1.5, through which exhaust gas is introduced from an internal combustion engine 9.1 per FIG. 4 into the exhaust-gas module A. The second side wall 1.6 is bounded by the connection contour 1.3, on which a connection collar 2.4 can be arranged, for example. A circumferential contour U1 of the second side wall 1.6 or the connection contour 1.3 in this sample embodiment has a substantially quadratic basic shape G1.

The second exhaust-gas module B serves for the optional placement on or flanging to the exhaust-gas module A. The exhaust-gas module B comprises, in corresponding manner, an attachment housing 2 with several outer walls, a circumferential first housing wall 2.5 and at least one second housing wall 2.6 which can be placed opposite the attachment housing A. In the region of an end face 2.8 situated opposite the second housing wall 2.6 there is provided an inlet 2.1, which can be brought into a flow-through connection with the outlet 1.2 of the exhaust-gas module A when the two exhaust-gas modules A, B are assembled together. In the sample embodiment, the exhaust-gas module B is bounded at the end face 2.8 by an additional housing wall 2.7. But this is not absolutely essential, since the exhaust-gas module B is closed in the region of the end face 2.8 by the connected exhaust-gas module A.

Both the base housing 1 with the side walls 1.5, 1.6, 1.9 and the attachment housing 2 with the housing walls 2.5, 2.6 form an integral housing wall 5.1, 5.2, in which all exhaust-gas purification components 3 and all acoustic components 4 are contained. Whereas in the case of the base housing 1 the integral housing wall 5.1 is also formed by the side wall 1.6, the attachment housing 2 can be designed with no housing wall in the region of the end face 2.8.

The exhaust-gas module B likewise has a fastening contour 2.3 in corresponding manner, which likewise has a circumferential contour U2 with rectangular basic shape G2.

Figure 3:
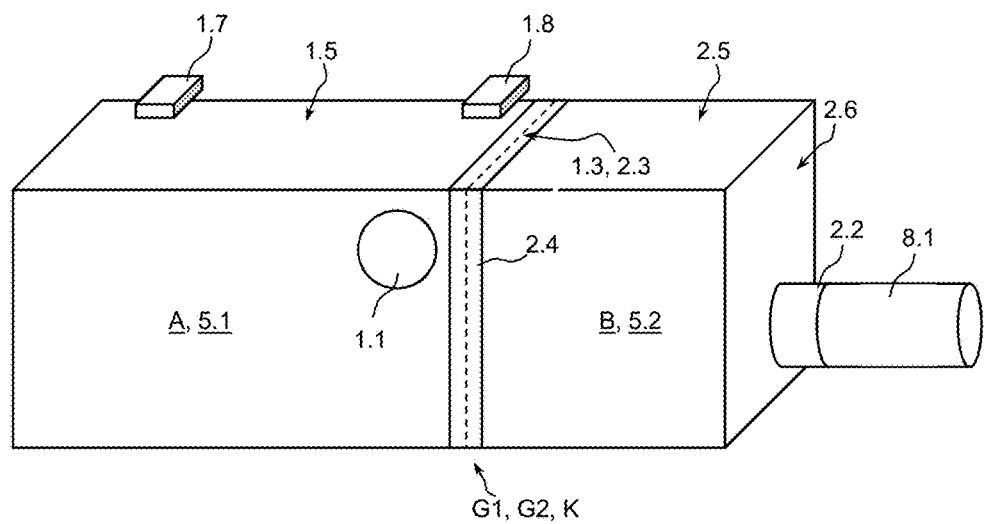
FIG. 3 the two housings in the assembled state.

Both exhaust-gas modules A, B can be brought to bear or connected mutually via the two connection or fastening contours 1.3, 2.3, so that the outlet 1.2 stands in a flow-through connection with the inlet 2.1. Thanks to the connection or fastening contours 1.3, 2.3, a connection is produced between the two exhaust-gas modules A, B. This can be done by direct welding of the two housings 1, 2 or, as shown in FIG. 3, by the use of a connection collar 2.4, joining the two modules A, B. The connection or fastening contours 1.3, 2.3 can also be designed as a support flange.

The first side wall 1.5 and the first housing wall 2.5 need not be circumferential. Supplemental side walls or housing walls can also be provided.

For purposes of fastening, the exhaust-gas after-treatment unit consisting of exhaust-gas module A with the attached exhaust-gas module B is secured via support means 1.7, 1.8, as shown in FIG. 3, to a motor vehicle 9 or a motor vehicle frame, not otherwise depicted. It is to be noted that only the exhaust-gas module A is fastened to the motor vehicle 9 via the support means 1.7, 1.8, while the exhaust-gas module B is fastened via the connection and fastening contour 1.3, 2.3 or the alternatively used connection collar 2.4 to the exhaust-gas module A. Ultimately, only just the exhaust tailpipe 8.1 is attached to the outlet 2.2 of the exhaust-gas module B. If the exhaust-gas after-treatment unit only consists of the exhaust-gas module A alone, this is likewise fastened via the support means 1.7, 1.8 to the motor vehicle. The exhaust tailpipe 8.1 is then attached to the outlet 1.2 of the exhaust-gas module A.

Figure 2:
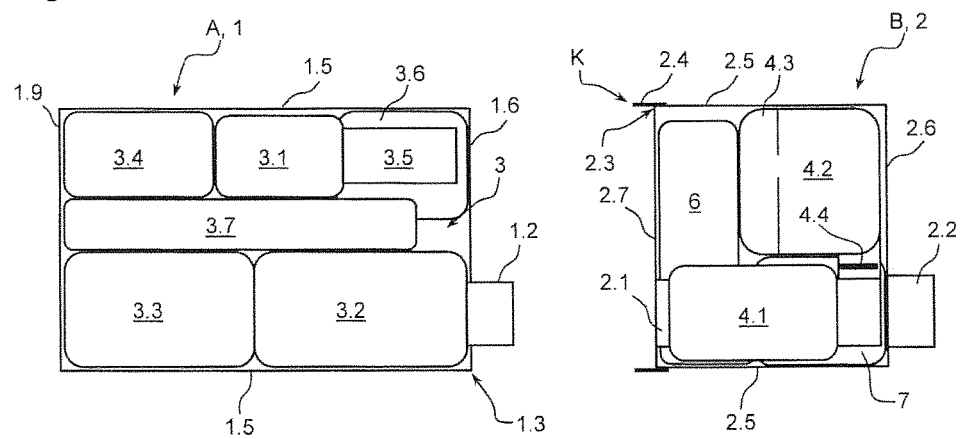
FIG. 2 a cross sectional representation of the respective housing.

As can be seen in FIG. 2, the exhaust-gas module A comprises several exhaust-gas purification components 3 such as a SCR 3.1, a DOC 3.2, a DPF 3.3, a NH3 3.4, a LNT 3.5 a HOH 3.6 and/or auxiliary components 3.7 for these, through which the exhaust gas flows, starting from the inlet 1.1, and leaving the exhaust gas housing A at the outlet 1.2.

When the exhaust-gas module B is absent, the exhaust gas or the exhaust gas flow exits from the exhaust gas system with no further exhaust gas treatment. However, an exhaust tailpipe 8.1 not shown here should still be mounted at the outlet 1.2.

When using the exhaust-gas module B, whose inlet 2.1 is connected to the outlet 2.2 of the exhaust-gas module A, the exhaust gas or the exhaust gas flow after exiting from the exhaust-gas module A moves through various acoustic after-treatment components 4, such as a reflection chamber 4.1, a Helmholtz resonator 4.2, a Lambda/4 resonator 4.3 and/or an exhaust flap 4.4, all of which are arranged in the exhaust-gas module B. Alternatively and/or in addition to this, a thermoelectric generator 6 or a thermodynamic unit 7 can also be arranged in the exhaust-gas module B. The exhaust-gas purification components 3 are placed exclusively in the exhaust-gas module A, while the acoustic components 4 not having any active chemical cleaning action are arranged in the exhaust-gas module B. The exhaust-gas module B is connected to the exhaust-gas module A via the connection collar 2.4 shown in FIG. 2 with the contour K, which corresponds to the basic shape G1 or G2, and thus also to the circumferential contour U1, U2.

Figure 4:
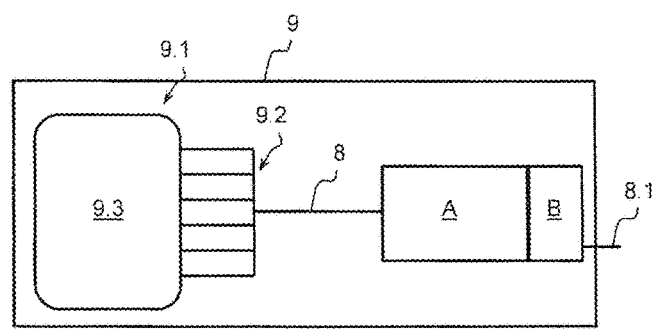
FIG. 4 a schematic of a motor vehicle with both exhaust-gas modules.

FIG. 4 shows the exhaust-gas after-treatment unit integrated in a vehicle 9 with an internal combustion engine 9.1 and with a cylinder head 9.3, to which a manifold 9.2 is attached with an exhaust pipe system 8 connected to it. The two exhaust-gas modules A, B are integrated in the exhaust pipe system 8, which discharge the exhaust gas through the exhaust tailpipe 8.1.

LIST OF REFERENCE SYMBOLS

1 Base housing
1.1 Inlet, inlet branch
1.2 Outlet, exhaust-gas channel
1.3 Connection contour, support flange
1.5 First side wall
1.6 Second side wall
1.7 Support means
1.8 Support means
1.9 Additional side wall
2 Attachment housing
2.1 Inlet
2.2 Outlet
2.3 Fastening contour
2.4 Connection collar
2.5 First housing wall
2.6 Second housing wall
2.7 Additional housing wall
2.8 End face
3 Exhaust-gas purification component
3.1 SCR
3.2 DOC
3.3 DPF
3.4 NH3
3.5 LNT
3.6 HOH
3.7 Auxiliary component
4 Acoustic Component
4.1 Reflection chamber
4.2 Helm holtz resonator
4.3 Lambda/4 resonator
4.4 Exhaust flap
5.1 Housing wall
5.2 Housing wall
6 Thermoelectric generator
7 Thermodynamic unit
8 Exhaust pipe system
8.1 Exhaust tailpipe
9 Motor vehicle
9.1 Internal combustion engine
9.2 Manifold
9.3 Cylinder head
A Exhaust-gas module
B Exhaust-gas module
E Plane, mirror plane
G1 Basic shape of 1.3
G2 Basic shape of 2.3
K Contour
U1 Circumferential contour of 1.3
U2 Circumferential contour of 2

What is claimed is:

1. An exhaust-gas module A for an internal combustion engine, comprising: a base housing having a first side wall, at least one second side wall, an inlet for connection to the internal combustion engine and at least one outlet, wherein the inlet is arranged in the first side wall, and having exhaust-gas purification components which are arranged in the base housing, wherein the exhaust-gas purification components include at least one SCR and/or one DOC,
wherein the at least one outlet is arranged in the second side wall and serves for the connection of an exhaust tailpipe of the internal combustion engine or alternatively for the coupling of an attachment housing, wherein the rest of the base housing, with the exception of the second side wall, is formed without outlets, wherein a connection contour with a circumferential contour U1 which has a basic shape G1 is provided for the connection of the attachment housing, wherein the connection contour delimits the second side wall at an outer edge of the second side wall, wherein the exhaust-gas purification components further include at least one DPF, ammonia trapping catalyst, LNT or hydrolysis catalyst, and/or wherein at least one auxiliary component is comprised in the base housing, and wherein the second side wall encloses the exhaust-gas purification components such that the base housing has a closed module design.

2. The exhaust-gas module A according to claim 1, wherein the base housing with the side walls forms an integral housing wall, in which all exhaust-gas purification components and the at least one auxiliary component are contained.

3. The exhaust-gas module A according to claim 2, wherein an exhaust tailpipe of the internal combustion engine is connected to the outlet.

4. The exhaust-gas module A according to claim 1, wherein an exhaust tailpipe of the internal combustion engine is connected to the outlet.

5. An exhaust-gas after-treatment unit consisting of an exhaust-gas module A according to claim 1 and an exhaust-gas module B, comprising: an attachment housing having a first housing wall, at least one second housing wall, an outlet and an inlet for connection to a base housing, and comprising an end face with a fastening contour for connection to the base housing, wherein the inlet is placed at the end face and the outlet is arranged in the second housing wall and serves to connect an exhaust tailpipe of the internal combustion engine, wherein the fastening contour has a circumferential contour U2 with a basic shape G2, wherein the fastening contour at least partly delimits the first housing wall at an edge, and at least one acoustic component is contained in the attachment housing for reducing noise emission of an exhaust gas, wherein the attachment housing is free of exhaust-gas purification components which bring about a chemical after-treatment of the exhaust gas,
wherein the outlet of the base housing can be coupled to the inlet of the attachment housing and the fastening contour can be connected to the connection contour, wherein the basic shape G1 and the basic shape G2 are identical or at least geometrically similar, and the second side wall of the exhaust-gas module A and the first housing wall of the exhaust-gas module B can be placed in proximity to each other, and wherein a diameter of the outlet of module A equals a diameter of the outlet of module B.

6. The exhaust-gas after-treatment unit according to claim 5, wherein a connection collar with a contour K geometrically similar to the basic shape G1, G2 is provided, which can be connected to the fastening contour and/or to the connection contour.

7. The exhaust-gas after-treatment unit according to claim 5, wherein exhaust-gas module A is connected to exhaust-gas module B, wherein the second side wall is designed in mirror symmetry with the outlet of the exhaust-gas module A and the second housing wall in mirror symmetry with the inlet of the exhaust-gas module B in regard to a parting plane E subtended between the second side wall and the second housing wall.

8. The exhaust-gas after-treatment unit according to claim 5, wherein exhaust-gas module A is connected to exhaust-gas module B, wherein the exhaust-gas module B is secured solely to the exhaust-gas module A and the exhaust-gas module A is fixed via support means to a motor vehicle, wherein the exhaust-gas module B is free of support means serving for a fastening to the motor vehicle.

9. The exhaust-gas module according to claim 1, wherein an exhaust tailpipe is provided, which is between 10 mm and 800 mm in length.

10. The exhaust-gas module according to claim 9, wherein the exhaust tailpipe is between 200 mm and 600 mm in length.

11. The exhaust-gas module according to claim 1, wherein an exhaust tailpipe is provided with cross section not rotationally symmetrical, having an effective flow cross section between 3850 mm$^2$ and 17,680 mm$^2$.

12. A system consisting of an exhaust-gas module according to claim 1, with an exhaust pipe system connected to the inlet of the base housing and/or a manifold for connection to a cylinder head of the internal combustion engine.

13. An exhaust-gas module B for an internal combustion engine, comprising: an attachment housing having a first housing wall, at least one second housing wall, an outlet and an inlet for connection to a base housing, and comprising an end face with a fastening contour for connection to the base housing,
wherein the inlet is placed at the end face and the outlet is arranged in the second housing wall and serves to connect an exhaust tailpipe of the internal combustion engine, wherein the fastening contour has a circumferential contour U2 with a basic shape G2, wherein the fastening contour at least partly delimits the first housing wall at an outer edge of the first housing wall, and at least one acoustic component is contained in the attachment housing for reducing noise emission of an exhaust gas, wherein the attachment housing is free of exhaust-gas purification components which bring about a chemical after-treatment of the exhaust gas, wherein the end face encloses the at least one acoustic component such that the attachment housing has a closed module design.

14. The exhaust-gas module B according to claim 13, wherein a thermoelectric generator is contained in the attachment housing as an additional component.

15. The exhaust-gas module B according to claim 13, wherein at least one Helmholtz resonator and/or one Lambda/4 resonator and/or one reflection chamber and/or one exhaust flap are provided in the attachment housing as the at least one acoustic component.

16. The exhaust-gas module B according to claim 13, wherein the attachment housing with the housing walls forms an integral housing wall in which all acoustic components are contained.

17. The exhaust-gas module B according to claim 16, wherein the integral housing wall encompasses a volume between 1 liter and 200 liters.

18. An exhaust-gas module A for an internal combustion engine, comprising: a base housing having a first side wall, at least one second side wall, an inlet for connection to the internal combustion engine and at least one outlet, wherein the inlet is arranged in the first side wall, and having exhaust-gas purification components which are arranged in the base housing, wherein the exhaust-gas purification components include at least one SCR and/or one DOC,
wherein the at least one outlet is arranged in the second side wall and serves for the connection of an exhaust tailpipe of the internal combustion engine or alternatively for the coupling of an attachment housing, wherein the rest of the base housing, with the exception of the second side wall, is formed without outlets, wherein a connection contour with a circumferential contour U1 which has a basic shape G1 is provided for the connection of the attachment housing, wherein the connection contour delimits the second side wall at an outer edge of the second side wall, wherein the exhaust-gas purification components further include at least one DPF, ammonia trapping catalyst, LNT or hydrolysis catalyst, and/or wherein at least one auxiliary component is comprised in the base housing, wherein the outlet is designed as a branch pipe, and wherein the second side wall encloses the exhaust-gas purification components such that the base housing has a closed module design.

19. The exhaust-gas module B according to claim 17, wherein the integral housing wall encompasses a volume between 50 liters and 80 liters.

* * * * *